US009582882B2

(12) United States Patent
Chen et al.

(10) Patent No.: US 9,582,882 B2
(45) Date of Patent: Feb. 28, 2017

(54) METHOD AND APPARATUS FOR IMAGE REGISTRATION IN THE GRADIENT DOMAIN

(71) Applicant: Nokia Technologies OY, Espoo (FI)

(72) Inventors: Xin Chen, Evanston, IL (US); Junzhou Huang, Grapevine, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/635,027

(22) Filed: Mar. 2, 2015

(65) Prior Publication Data

US 2016/0260219 A1 Sep. 8, 2016

(51) Int. Cl.
G06T 7/00 (2006.01)
G06T 11/60 (2006.01)

(52) U.S. Cl.
CPC ............ G06T 7/0024 (2013.01); G06T 11/60 (2013.01)

(58) Field of Classification Search
CPC . G06T 2207/10088; G06T 2207/20161; G06T 7/0089; G06T 11/60; G06T 2207/10081; G06T 2207/30016; G06T 2207/30048; G06T 7/0024; G06K 9/6202; G06K 9/68
See application file for complete search history.

(56) References Cited

U.S. PATENT DOCUMENTS

| 6,621,929 | B1* | 9/2003 | Lai | G06K 9/6202 382/181 |
| 7,680,312 | B2 | 3/2010 | Jolly et al. | |
| 8,818,038 | B2 | 8/2014 | Peleg et al. | |
| 9,113,043 | B1 | 8/2015 | Kim et al. | |
| 2003/0053667 | A1* | 3/2003 | Paragios | G06T 7/0083 382/128 |
| 2003/0235337 | A1* | 12/2003 | Paragios | G06K 9/00362 382/215 |
| 2006/0013482 | A1* | 1/2006 | Dawant | G06T 7/0083 382/173 |
| 2008/0170791 | A1* | 7/2008 | Eskildsen | G06K 9/48 382/199 |
| 2008/0316202 | A1 | 12/2008 | Zhou et al. | |
| 2009/0080779 | A1 | 3/2009 | Chefd'hotel et al. | |
| 2010/0049451 | A1* | 2/2010 | Lu | G01N 3/12 702/42 |
| 2010/0111386 | A1* | 5/2010 | El-Baz | G06T 7/0016 382/128 |
| 2011/0176746 | A1 | 7/2011 | Bucki et al. | |
| 2011/0310084 | A1 | 12/2011 | Umezaki | |

(Continued)

OTHER PUBLICATIONS

Cachier et al. (Iconic feature based nonrigid regestration: the PASHA algorithm), Computer Vision and Image Uderstading 89 (2003) pp. 272-298.*

(Continued)

Primary Examiner — Jingge Wu
(74) Attorney, Agent, or Firm — Alston & Bird LLP

(57) ABSTRACT

A method, apparatus and computer program product are provided for image registration in the gradient domain. A method is provided including receiving a first image and second image; and registering the first and second images in a gradient domain. The registration of the first and second images in the gradient domain includes applying an energy minimization function based on total variation.

20 Claims, 5 Drawing Sheets

(56) References Cited

U.S. PATENT DOCUMENTS

| | | | |
|---|---|---|---|
| 2012/0039532 A1 | 2/2012 | Chao et al. | |
| 2012/0110491 A1* | 5/2012 | Cheung | G06T 11/60 715/771 |
| 2013/0051685 A1* | 2/2013 | Shechtman | G06T 11/60 382/218 |
| 2013/0201450 A1* | 8/2013 | Bailey | A61B 3/14 351/206 |
| 2014/0071125 A1* | 3/2014 | Burlina | G06T 7/2033 345/420 |
| 2014/0126834 A1* | 5/2014 | Jiang | G06T 5/00 382/266 |

OTHER PUBLICATIONS

Demirovic et al. (Total Variation Filtered Demons for Improved Registration of Sliding Organs) ISRN Biomathematics VI. 2013, article ID 534891.*

Aristeidis Sotiras, Christos Davatzikos, and Nikos Paragios, "Deformable medical image registration: A survey," *IEEE Transactions on Medical Imaging*, vol. 32, No. 7, pp. 1153-1190, 2913.

JB Maintz and Max A Viergever, "A survey of medical image registration," *Medical image analysis*, vol. 2, No. 1, pp. 1-36, 1998.

Paul Viola and William M Wells III, "Alignment by maximization of mutual information," *International Journal of Computer Vision*, vol. 24, No. 2, pp. 137-154, 1997.

Andriy Myronenko and Xubo Song, "Intensity-based image registration by minimizing residual complexity," *IEEE Transactions on Medical Imaging*, vol. 29, No. 11, pp. 1882-1891, 2010.

Jan Modersitzki and Stefan Wirtz, "Combining homogenization and registration," *in Biomedical Image Registration*, pp. 257-263. 2006.

Boaz Cohen and Itshak Dinstein, "New maximum likelihood motion estimation schemes for noisy ultrasound images," *Pattern Recognition*, vol. 35, No. 2, pp. 455-463, 2002.

Andriy Myronenko, Xubo Song, and David J Sahn, "Maximum likelihood motion estimation in 3d echocardiography through non-rigid registration in spherical coordinates," *in Functional Imaging and Modeling of the Heart*, pp. 427-436. 2009.

Deanna Needell and Rachel Ward, "Stable image reconstruction using total variation minimization," *SIAM Journal on Imaging Sciences*, vol. 6, No. 2, pp. 1035-1058, 2013.

Noppadol Chumchob, "Vectorial total variation-based regularization for variational image registration," *IEEE Transactions on Image Processing*, vol. 22, No. 11, 2013. pp. 4551-4559.

Claudia Frohn-Schauf, Stefan Henn, and Kristian Witsch, "Multigrid based total variation image registration," *Computing and Visualization in Science*, vol. 11, No. 2, pp. 101-113, 2008.

Daniel Rueckert, Luke I Sonoda, Carmel Hayes, Derek LG Hill, Martin O Leach, and David J Hawkes, "Nonrigid registration using freeform deformations: application to breast MR images," *IEEE Transactions on Medical Imaging*, vol. 18, No. 8, pp. 712-721, 1999.

Chris A Cocosco, Vasken Kollokian, Remi K-S Kwan, G Bruce Pike, and Alan C Evans, "Brainweb: Online interface to a 3d MRI simulated brain database," *NeuroImage*, May 1997;5(4):S425.

Frederic Zana and Jean-Claude Klein, "A multimodal registration algorithm of eye fundus images using vessels detection and hough transform," *IEEE Transactions on Medical Imaging*, vol. 18, No. 5, pp. 419-428, 1999.

Modersitzki, Jan, "Numerical Methods for Image Registration," *Numerical Mathematics and Scientific Computation*; Copyright 2004; 109 pages.

Office Action for U.S. Appl. No. 14/673,923 dated Jan. 20, 2016.

Aristeidis Sotiras, Christos Davatzikos, and Nikos Paragios, "Deformable medical image registration: A survey," *IEEE Transactions on Medical Imaging*, vol. 32, No. 7, pp. 1153-1190, 2013.

Notice of Allowance for U.S. Appl. No. 14/673,923 dated Jun. 9, 2016.

Extended European Search Report for corresponding European Application No. 16158162.4 dated Sep. 29, 2016.

Li, Y. et al., *Deep Sparse Representation for Robust Image Registration*, IEEE Conference on Computer Vision and Pattern Recognition (CVPR), (2015) 4894-4901.

Maintz, J.B. et al., Comparison of edge-based and ridge-based registration of CT and MR brain images, *Medical Image Analysis*, Oxford University Press, (1996) vol. 1, No. 2, 151-161.

Mei, X. et al., *Fast Image Registration via Joint Gradient Maximization: Application to Multi-Modal Data*, Optical Sensing II, vol. 6395, (2006) 5 pages.

Peng, Y. et al., *RASL: Robust Alignment by Sparse and Low-Rank Decomposition for Linearly Correlated Images*, IEEE Transactions on Pattern Analysis and Machine Intelligence, vol. 34, No. 11, (Nov. 2012) 2233-2246.

* cited by examiner

METHOD AND APPARATUS FOR IMAGE REGISTRATION IN THE GRADIENT DOMAIN

TECHNOLOGICAL FIELD

An example embodiment of the present invention relates to image registration and, more particularly, to image registration in the gradient domain.

BACKGROUND

There is a large disparity between composite images based on image registration. The composite images may have significantly different appearances due to intensity variation of the images used to generate the composite images. For example, satellite and aerial images taken of the same object may have markedly different intensities, at different times of day, different seasons of the year, different image angles, different altitudes, different image captures systems, or the like. In some fields such as medical imaging or biometrics, image alignment is critical for diagnosis and identification. However, images of the same object when examined at a detailed level may not be properly aligned due to intrinsic and extrinsic variation.

Image registration aims to find the geometrical transformation to align two or more images into the same coordinate system. Geometric transformations have typically been estimated as rigid, piecewise-rigid, or non-rigid. Non-rigid is the most complex. Some existing methods of image registration can be classified based on the variables used in non-rigid registration, into feature-based registration and intensity-based registration.

Many non-rigid techniques have been proposed, most of which are based on minimizing an energy function containing a distance, or similarity, measure and a regularization term. The regularization may encourage certain types of transformations related to different applications and the minimum distance may correspond to a correct spatial alignment.

One type of distance measure is based on mutual information (MI) of images. However, in many applications, the intensity fields of the images may differ significantly. For example, slow varying intensity bias fields often exist in brain magnetic resonance images; while in temporal registration of retina images, the images may contain severe intensity artifacts. As a result, many of the existing intensity based distance measures are not robust to these intensity distortions. There are also methods for simultaneous registration and intensity correction, but they may involve much high computational complexity and suffer from multiple local minima.

In another image registration method, a similarity measure called residual complexity (RC) has been used, where the discrete cosine transform (DCT) is used to code the residual image. RC may be more accurate and robust than MI, for dealing with intensity distortions requiring several parameters, such as regularization, to effect the computation.

BRIEF SUMMARY

A method and apparatus are provided in accordance with an example embodiment for image registration in the gradient domain. In an example embodiment, a method is provided that includes receiving a first image and second image and registering the first and second images in a gradient domain. The registration of the first and second images in the gradient domain includes applying an energy minimization function based on total variation.

In an example embodiment of the method, registering the first and second images in the gradient domain includes determining parameters for a first image registration, registering the first and second images based on the first image registration parameters, determining a gradient error associated with the first image registration, determining if the gradient error satisfies a predetermined minimization value, and generating a composite image, in an instance in which the gradient error satisfies the predetermined minimization value. In some example embodiments of the method, registering the first and second images in the gradient domain further includes incrementing the image registration parameters for a second image registration, registering the first and second images based on the second image registration parameters, determining the gradient error associated with the second image registration, comparing the gradient error of the first image registration to the gradient error of the second image registration, determining if a change in gradient error between the first image registration and the second image registration satisfies a predetermined gradient change value, and generating a composite image, in an instance in which the change in gradient error satisfies the predetermined gradient change value.

In an example embodiment of the method, registering the first and second images in the gradient domain also includes reperforming the incrementing the registration parameters, registering the first and second images, determining the gradient error, and comparing the gradient errors. In some example embodiments of the method, registration of the first and second images creates a gradient error and the gradient error is total variation.

In an example embodiment of the method, registering the first and second images in the gradient domain is based on a gradient descent algorithm. In some example embodiments of the method, a gradient is an edge within an image.

In another example embodiment, an apparatus is provided including at least one processor and at least one memory including computer program code, with the at least one memory and computer program code configured to, with the processor, cause the apparatus to at least receive a first image and second image and register the first and second images in a gradient domain. The registration of the first and second images in the gradient domain includes applying an energy minimization function based on total variation.

In an example embodiment of the apparatus, registering the first and second images in the gradient domain included determining parameters for a first image registration, registering the first and second images based on the first image registration parameters, determining a gradient error associated with the first image registration, determining if the gradient error satisfies a predetermined minimization value, and generating a composite image, in an instance in which the gradient error satisfies the predetermined minimization value. In some example embodiments of the apparatus, registering the first and second images in the gradient domain also includes incrementing the image registration parameters for a second image registration, registering the first and second images based on the second image registration parameters, determining the gradient error associated with the second image registration, comparing the gradient error of the first image registration to the gradient error of the second image registration, determining if a change in gradient error between the first image registration and the second image registration satisfies a predetermined gradient change value, and generating a composite image, in an instance in which the change in gradient error satisfies the predetermined gradient change value.

In an example embodiment of the apparatus, registering the first and second images in the gradient domain also includes reperforming the incrementing the registration parameters, registering the first and second images, determining the gradient error, and comparing the gradient errors. In some example embodiments of the apparatus, registration of the first and second images creates a gradient error and the gradient error is total variation.

In an example embodiment of the apparatus, registering the first and second images in the gradient domain is based on a gradient descent algorithm. In some example embodiments of the apparatus, a gradient is an edge within an image.

In a further example embodiment, a computer program product is provided including at least one non-transitory computer-readable storage medium having computer-executable program code portions stored therein, with the computer-executable program code portions comprising program code instructions configured to receive a first image and second image and register the first and second images in a gradient domain. The registration of the first and second images in the gradient domain includes applying an energy minimization function based on total variation.

In an example embodiment of the computer program product, registering the first and second images in the gradient domain includes determining parameters for a first image registration, registering the first and second images based on the first image registration parameters, determining a gradient error associated with the first image registration, determining if the gradient error satisfies a predetermined minimization value, and generating a composite image, in an instance in which the gradient error satisfies the predetermined minimization value. In some example embodiments of the computer program product, registering the first and second images in the gradient domain also includes incrementing the image registration parameters for a second image registration, registering the first and second images based on the second image registration parameters, determining the gradient error associated with the second image registration, comparing the gradient error of the first image registration to the gradient error of the second image registration, determining if a change in gradient error between the first image registration and the second image registration satisfies a predetermined gradient change value, and generating a composite image, in an instance in which the change in gradient error satisfies the predetermined gradient change value.

In an example embodiment of the computer program product, registering the first and second images in the gradient domain also includes reperforming the incrementing the registration parameters, registering the first and second images, determining the gradient error, and comparing the gradient errors. In some example embodiments of the computer program product, registration of the first and second images creates a gradient error and the gradient error is total variation. In an example embodiment of the computer program product, registering the first and second images in the gradient domain is based on a gradient descent algorithm. In some example embodiments of the computer program product, a gradient is an edge within an image.

In yet another example embodiment, an apparatus is provided including means for receiving a first image and second image and means for registering the first and second images in a gradient domain, wherein registration the first and second images in the gradient domain includes applying an energy minimization function based on total variation.

In some example embodiments of the apparatus, registering the first and second images in the gradient domain includes determining parameters for a first image registration, registering the first and second images based on the first image registration parameters, determining a gradient error associated with the first image registration, determining if the gradient error satisfies a predetermined minimization value, and generating a composite image, in an instance in which the gradient error satisfies the predetermined minimization value. In an example embodiment of the apparatus, registering the first and second images in the gradient domain also includes incrementing the image registration parameters for a second image registration, registering the first and second images based on the second image registration parameters, determining the gradient error associated with the second image registration, comparing the gradient error of the first image registration to the gradient error of the second image registration, determining if a change in gradient error between the first image registration and the second image registration satisfies a predetermined gradient change value, and generating a composite image, in an instance in which the change in gradient error satisfies the predetermined gradient change value.

In some example embodiments of the apparatus, registering the first and second images in the gradient domain also includes reperforming the incrementing the registration parameters, registering the first and second images, determining the gradient error, and comparing the gradient errors. In an example embodiment of the apparatus, registration of the first and second images creates a gradient error, and the gradient error is total variation. In some example embodiments of the apparatus, registering the first and second images in the gradient domain is based on a gradient descent algorithm. In an example embodiment of the apparatus, a gradient is an edge within an image.

BRIEF DESCRIPTION OF THE DRAWINGS

Figure 1:
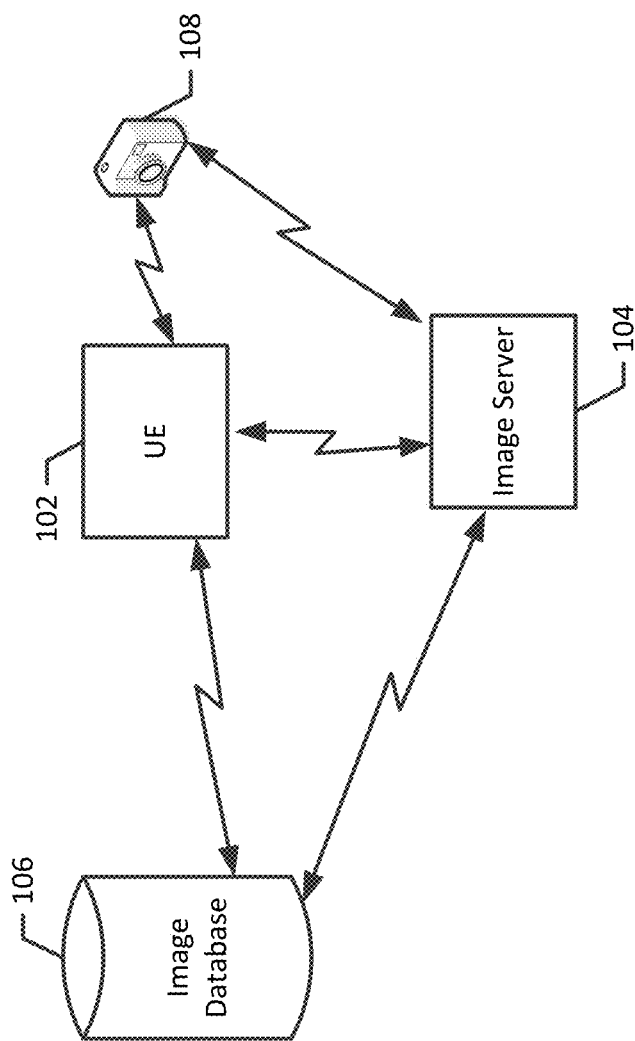
Figure 2:
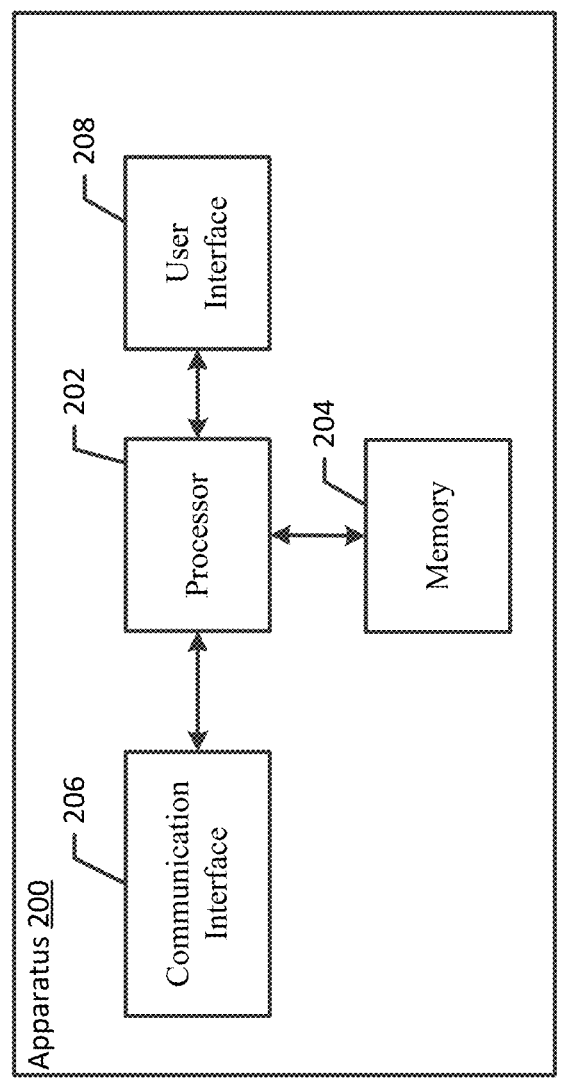
Figure 3:
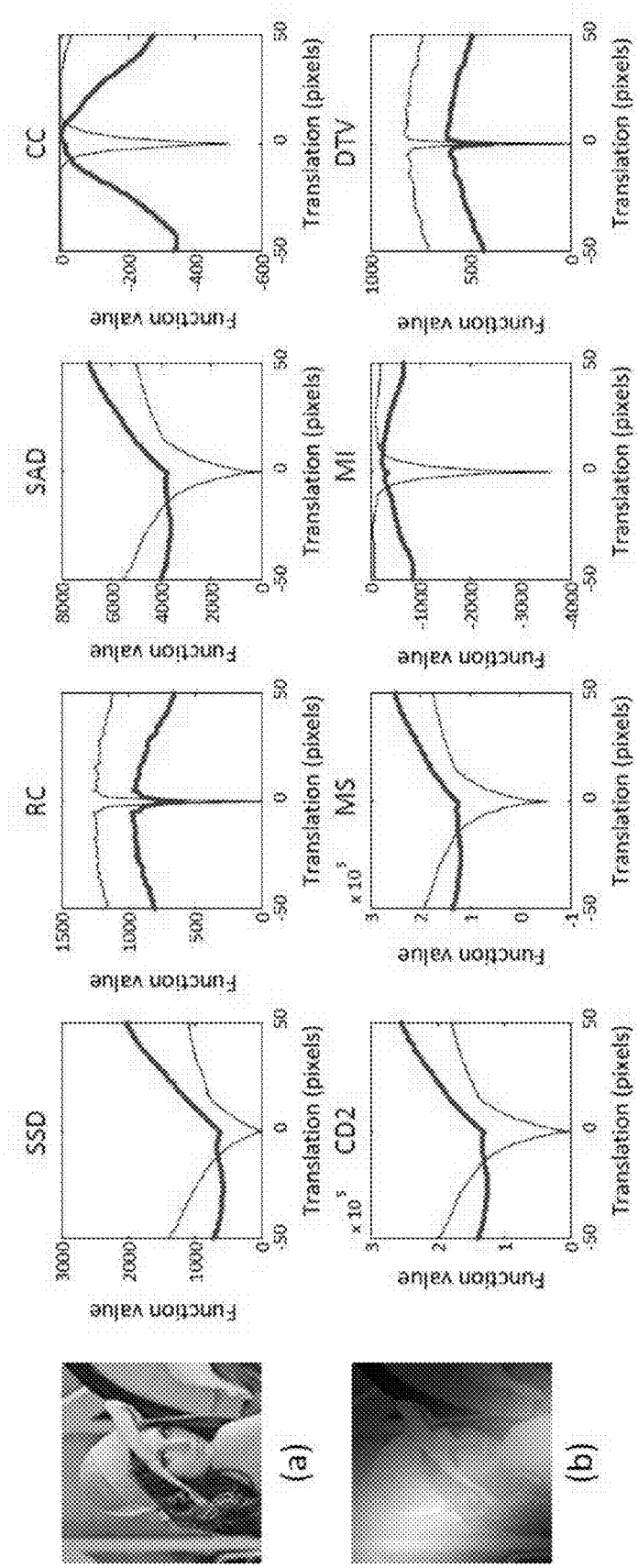
Figure 4:
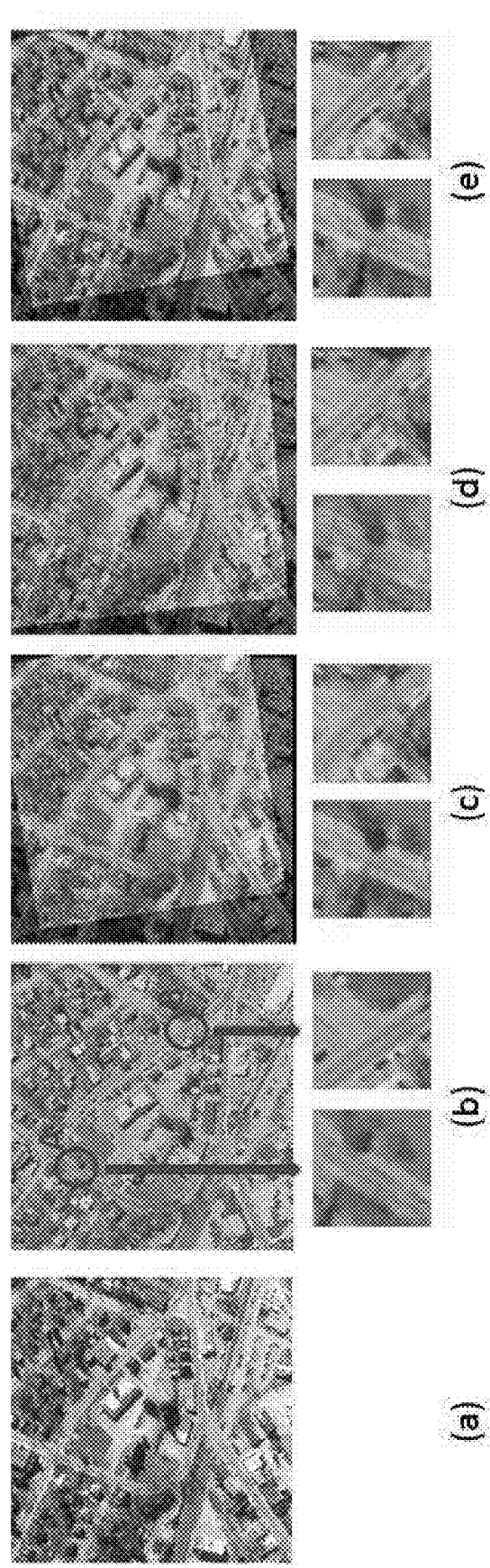

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for image registration in the gradient domain in accordance with an example embodiment of the present invention;

FIG. 3 illustrates a comparison of image registration methods with intensity variation;

FIG. 4 illustrates a comparison of image registration methods; and

Figure 5:
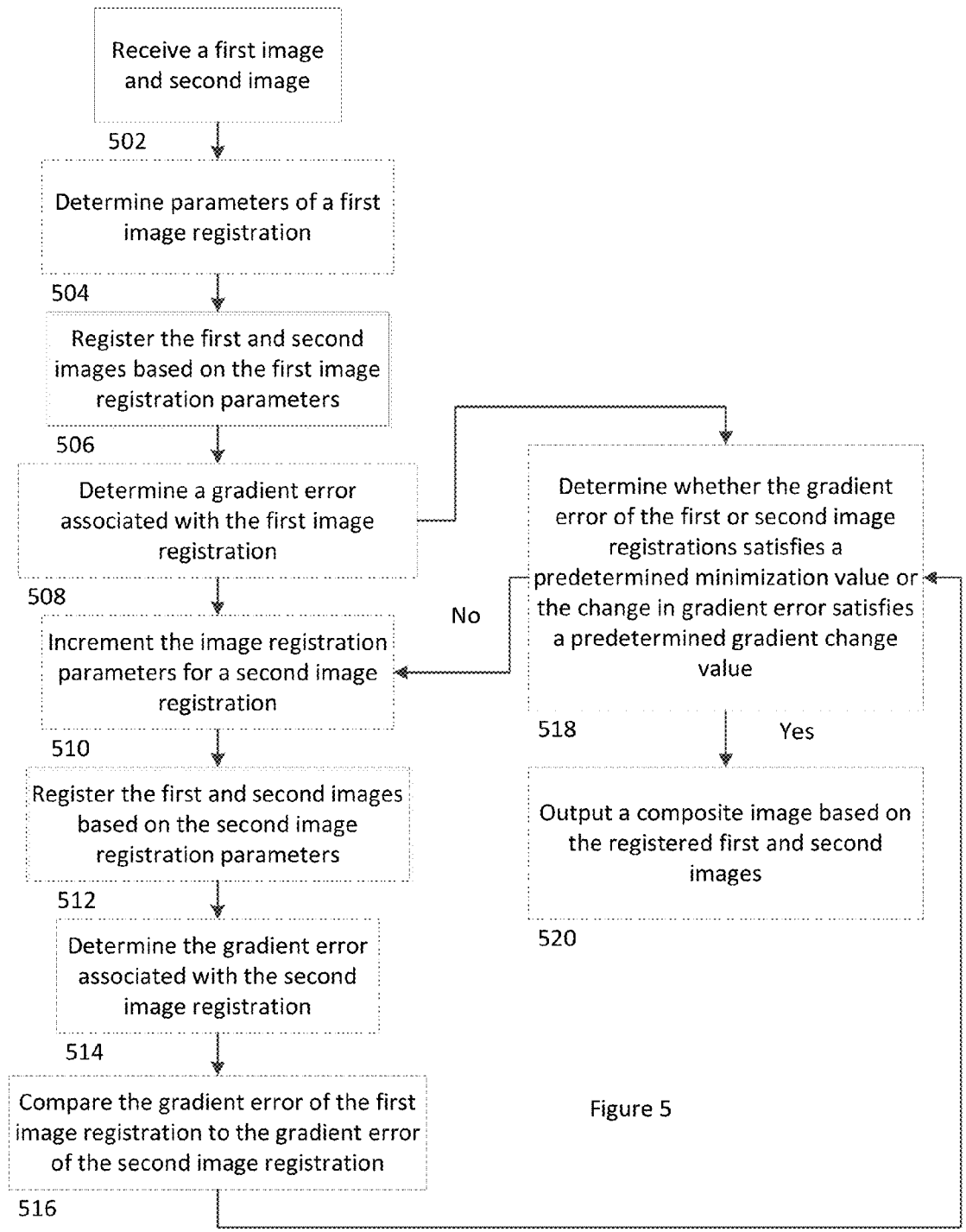

FIG. 5 illustrates an example process image registration in the gradient domain in accordance with an embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Overview

Image gradients, or edges, may be much more stationary than image pixels under spatially varying intensity distortions. Based on image gradients a new similarity measure may be utilized for intensity based image registration, which matches the edges of two images. Minimizing an energy function based on the matched edges encourages the edges of the residual, e.g. composite, image to be sparse, and any misalignment will increase the sparseness. Further a gradient descent algorithm, or backtracking gradient descent algorithm, may be used to reduce any differential total variation (DTV) generated by the energy function based on matched edges. The image registration process may also not require input parameters, such as regularization. Additionally, the computational load of the image registration process is linear, for each iteration of the gradient descent algorithm, based on the number of pixels in the images. The gradient descent algorithm based DTV image registration may be robust across a wide range of image registration applications with intensity artifacts and intensity outliers.

A method, apparatus and computer program product are provided in accordance with an example embodiment for image registration in the gradient domain. FIG. 1 illustrates a communication diagram including, an image server 104 in data communication with a user equipment (UE) 102, image database 106, and an image capture device 108. The communication between devices may be a wired, wireless, or any combination of wired and wireless communication networks, such as cellular, WiFi, internet, local area networks, or the like.

The UE 102 may be a mobile computing device such as a laptop computer, tablet computer, mobile phone, smart phone, navigation unit, personal data assistant, watch, camera, or the like. Additionally or alternatively, the UE 102 may be a fixed computing device, such as a personal computer, computer workstation, kiosk, office terminal computer or system, or the like. The image server 104 may be one or more fixed or mobile computing devices. The UE 102 and/or the image server 104 may be in data communication with or otherwise associated with an image capture device 108, e.g. camera.

The image capture device 108 may be a portion of the UE 102 or otherwise associated with the UE or image server 104. The image capture device 108 may be a fixed image camera, a video camera, magnetic resonance imager, X-ray imager, or the like capable of capturing one or more images of an object. The image may be an aerial image, e.g. an image captured from a substantially downward observation point, such as a satellite image or aerial photography from a plane, a portrait image of a specific object in the image frame, or a landscape image captured from a substantially horizontal observation point relative to the object. The images may be directly stored in the image server 104 or UE 102 or transmitted to the image server 104 for later processing.

The UE 102 or image server 104 may receive one or more images from the camera 108 or from the image database 106. The images may include one or more objects, such as buildings, streets, organs, people, animals, or the like.

The UE 102 or image server may determine first parameter values for a first image registration. The parameter values may be transformation or deformation values to be applied to the first or second image. In some example embodiments, the parameter value of the first image registration may be default values, such as zero. One of ordinary skill in the art would immediately recognize and understand that other values may be used, such as a transform or deformation estimates, based on other registration algorithms, such as the Residual complexity (RC) algorithm, or the prior knowledge of the end-user. The transformation or deformation may be applied to the second image.

The locations of the image gradients, e.g. edges may stay substantially stationary relative to each other in an image, even under spatially varying intensity distortions. The UE 102 or image server 104 may register the first and second images in the gradient domain. In an instance in which the images are not properly aligned, "ghost lines" may appear in the resultant composite image, e.g. the edges of the composite image will be less sparse.

The UE 102 or image server 104 may register the first and second images by applying an energy minimization function $\min_T E(T)$ to the first image and second images, such as the following equation.

$$\min_T E(T) = \|\nabla I - \nabla S(T)\|_1 \quad (1)$$

where I is the first image, and S is the second image. The equation may include vector $L_1$ norm to encourage sparseness of the composite image gradients. S(T) denotes the second image warped by the transformation or deformation (T).

Where r denotes a vectorized composite image I−S(T), the image registration may be written $$\min_T E(T) = \|r\|_{TV}, \quad (2).$$

where total variation TV for an image x with N pixels may be defined as $\|x\|_{TV} = \sum_{i=1}^{N}(|\nabla_1 x_i| + |\nabla_2 x_i|)$, and $\nabla_1$ and $\nabla_2$ denote forward finite difference operators on the image x.

Total variation TV or differential total variation DTV may be used as the similarity measure in the image registration equations shown above, e.g. a TV minimization. The TV or DTV minimization may be substantially different from TV regularization methods, which may use sum-of-the-squared-difference (SSD) as their similarity measure. For example, no regularization term may be used in TV minimization.

The UE 102 or image server 104 may determine a gradient error for the composite image. The UE 102 or image server 104 may compute the gradient of the energy function with respect to the transformation or deformation T. The TV minimization function may be convex but not necessarily smooth. To efficiently minimize the TV minimization function an approximation for the absolute value $|x|$ may be $|x| = \sqrt{x^2 + \epsilon}$, where $\epsilon$ is a small constant, such as $10^{-10}$. The UE 102 or image server 104 may compute the gradient error of the energy function $\nabla E(T)$ by utilizing the chain rule equation below.

$$\nabla E(T) = \sum_{i=1,2} J^T \nabla_i^{-1} \frac{\nabla_i r}{\sqrt{\nabla_i r \circ \nabla_i r + \epsilon}} \quad (3)$$

where $\nabla_i^{-1}$ denotes the inverse operation of $\nabla_i$; J denotes an image Jacobian matric with respect to the transformation or deformation parameters; and • denotes a Hadamard product.

The computational complexity of Equation 3 may be linear to the image size.

The UE 102 or image server 104 may determine if the gradient error satisfies a predetermined minimization value.

In an instance in which the gradient error satisfies, e.g. is equal to or less than a predetermined minimization value, such as zero or $10^{-5}$ (pixels), the UE 102 or image server 104 may output the composite image.

In an instance in which the UE 102 or image server 104 determines that the gradient error does not satisfy the predetermined minimization value, the UE or image server may apply a gradient decent algorithm. The gradient descent algorithm with back tracking may be used to minimize the energy function, such as Equation 1.

The UE 102 or the image server 104 may increment the transformation or deformation parameters for a second image registration, for example the UE or image server may increase or decrease the transformation or deformation parameters by a predetermined value, or step size. The UE 102 or image server 104 may determine an initial step size, such as $t_0 = 1$ and $\eta = 0.8$.

The UE 102 or image server 104 may register the first and second images using the second image registration parameters by applying the TV minimization function. The UE 102 or image server 104 may then determine the gradient error associated with the second image registration.

The UE 102 or image server 104 may determine if the gradient error satisfies the predetermined minimization value. In an instance in which the gradient error satisfies the predetermined minimization value, the UE 102 or image server 104 may output the composite image. In an instance in which the gradient error fails to satisfy the predetermined minimization value the UE 102 or image server 104 may compare the gradient error of the first image registration to the gradient error of the second image registration.

In an instance in which the gradient error between the first image registration and second image registration satisfies the predetermined gradient change value, e.g. the gradient error has not changed or changed less than a predetermined gradient change value, the UE 102 may determine that the gradient error has been minimized and output the composite image. In an instance in which the gradient error between the first image registration and the second image registration fails to satisfy the predetermined gradient change value, e.g. the gradient error has changed or has changed greater than the predetermined gradient change value, the UE 102 or image server 104 may increment the transformation or deformation parameters and repeat the registration and comparison of gradient errors.

In an instance in which the gradient error has increased from the first image registration to the second image registration, the UE 102 or image server 104 may increment the image registration parameters by applying a step size less than 1, such as 0.8. In an instance in which the gradient error has decreased from the first image registration to the second image registration, the UE 102 or image server 104 may increment the image registration parameters by applying a step size equal to or greater than 1.

The process may repeat until the UE 102 or image server 104 determines the gradient error of the second image registration satisfies the predetermined minimization value or the change in gradient error satisfies the predetermined gradient change value, e.g. a stop criteria is met. In an instance in which a stop criterion is met, the UE 102 or image server 104 may output the composite image.

In an example embodiment, the gradient descent algorithm may be applied as follows:

---

Input: I is the reference 2D image. S is the source 2D image. $t_0$ is the step size of the gradient descent. $\eta < 1$ is shrinkage parameter for shrinking the step size. $T_0$ is the initial values of the transformation parameters. k = 0 is the iteration counter.
Output: The transformation parameter $T_k$.
Repeat
   (1) Compute $T_{k+1} = T_k - t_k \nabla E(T_k)$ (2) If $\dfrac{E(T_{k+1})}{M_{k+1}} > \dfrac{E(T_k)}{M_k}$, set $t_{k+1} = \eta t_k$ and go back to (1)

(3) $t_{k+1} = t_k$
   (4) k = k +1
Until stop criterions.

---

Example Apparatus

A UE 102 or image server 104 may include or otherwise be associated with an apparatus 200 as shown in FIG. 2. The apparatus, such as that shown in FIG. 2, is specifically configured in accordance with an example embodiment of the present invention for image registration in the gradient domain. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium)

comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by a UE 102 or an image server 104. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 104, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Comparison of Image Registration with Intensity Variation

FIG. 3 illustrates a comparison of image registration methods with intensity variation. A first image (a) and a second image (b) is provided as an input to each image registration method. Severe intensity distortion and rescaling has been applied to the first image (a) resulting in the second image (b). Each of the image registration results depicts a horizontal translation using the respective similarity measures of the respective image registration methods. The image registration methods include SSD, RC, sum-of-absolute value (SAD), correlation coefficient (CC), Cohen & Dinstein ($CD_2$), Myronenko and Song (MS), MI, and DTV.

The image registration graphs depict function value on an x axis ranging from 0 to 3000, and translation on a y axis ranging from −50 to 50 pixels. The thick line represents a first image registration between first image (a) and first image (a). The thin line represents a second image registration between the first image (a) and the second image (b). Each of the image registration methods are able to determine an optimal alignment at a zero translation for the first image registration, as depicted by the dip in function value at 0 pixels. However, only the RC and DTV methods are able to determine an optimal alignment at a zero translation for the second image registration.

FIG. 4 illustrates a comparison of image registration methods. A first image (a) is an aerial image of a city segment. A second image (b) is an orthophoto of the same city segment from a slightly different angle. An image registration has been performed using the first image (a) and second image (b). Beneath the second image and each of the composite images a first image portion (A) and second image portion (B) are depicted at a larger scale to show the relative clarity of the image. The first composite image (c) is the result of the registration algorithm from the Image Processing Toolbox of MathWorks® METLAB® overlay, which includes significant residual edges, e.g. ghost lines and blurring. The second composite image (d) is the result of an RC image registration, which includes some ghost lines and blurring, but is clearer than the MAPLAB composite image (c). The third composite image (e) is the result of the DTV image registration which is substantially ghost line free.

Example Process for Image Registration in the Gradient Domain

Referring now to FIG. 5, the operations performed, such as by the apparatus 200 of FIG. 2, for image registration in the gradient domain are illustrated. As shown in block 502 of FIG. 5, the apparatus 200 may include means, such as a processor 202, memory 204, a communications interface 206, or the like, configured to receive a first image and a second image. The processor 202 may receive the image from the communications interface 206, which may in turn receive the image from a memory 204, such as an image database 106, or from a image capture device 108.

The image may be an aerial image, e.g. an image captured form a substantially downward perspective, such as a satellite image, a portrait image of a specific object in the image frame, or a landscape image captured from a substantially horizontal observation point relative to the object. The first and second images may include at least a portion of an object in each image.

As shown in block 504 of FIG. 5, the apparatus 200 may include means, such as a processor 202, or the like, configured to determine parameters of a first image registration. The parameter values may be transformation or deformation values to be applied to the first or second images. In some example embodiments, the parameter values for the first image registration may be default values, such as zero.

As shown at block 506 of FIG. 5, the apparatus 200 may include means, such as a processor 202, or the like, configured to register the first and second images based on the first image registration parameter values. In an example embodiment, the processor 202 may registrar the first and second images in the gradient domain. In some example embodiments, the processor 202 may register the first and second images by applying an energy minimization function $\min_T \nabla E(T)$ to the first image and second image, such as Equation 1.

As shown at block 508 of FIG. 5, the apparatus 200 may include means, such as a processor 202, or the like, configured to determine a gradient error associated with the first image registration. The processor 202 may determine a gradient error for the composite image. In an example embodiment, the processor 202 may compute the gradient of the energy function with respect to the transformation or deformation T. In some example embodiments, the processor 202 may compute the gradient error of the energy function $\nabla E(T)$ by utilizing the chain rule of equation 3.

The process may continue at block 510 by incrementing the image registration parameters for subsequent image registration. In an example embodiment, the process may continue at block 518 by determining if the gradient error satisfies a predetermined minimization value, in an instance in which the gradient error satisfies the predetermined minimization value the process may continue to block 520 without necessarily performing blocks 510-516.

As shown at block 510 of FIG. 5, the apparatus 200 may include means, such as a processor 202, or the like, configured to increment the image registration parameters for a second image registration. The processor 202 may increment the transformation or deformation parameters for a second image registration, for example the processor may increase or decrease the transformation or deformation parameters by a predetermined value, or step size.

As shown at block 512 of FIG. 7, the apparatus 200 may include means, such as a processor 202, or the like, configured to register the first and second images based on the second image registration parameters. The second image registration may be substantially similar to the image registration of block 506.

As shown at block 514 of FIG. 5, the apparatus 200 may include means, such as a processor 202, or the like, configured to determine a gradient error associated with the second image registration. Determining the gradient error associated with the second image registration may be substantially similar to determining the gradient error associated with the first image registration of block 508.

As shown in block 516 of FIG. 5, the apparatus 200 may include means, such as a processor 202, or the like, configured to compare the gradient error associated with the first image registration and the gradient error associated with the second image registration.

As shown in block 518 of FIG. 5, the apparatus 200 may include means, such as a processor 202, or the like, configured to determine whether the gradient error satisfies a predetermined minimization value or if the change in gradient error between the first image registration and the second image registration satisfies a predetermined minimization value.

The processor 202 may determine if the gradient error satisfies the predetermined minimization value. In an instance in which the gradient error satisfies the predetermined minimization value, the processor 202 may proceed to block 520 and output the composite image. In an instance in which the gradient error fails to satisfy the predetermined minimization value the processor 202 may compare the gradient error of the first image registration to the gradient error of the second image registration.

In an instance in which the gradient error between the first image registration and second image registration satisfies the predetermined gradient change value, e.g. the gradient error has not changed or changed less than a predetermined gradient change value, the processor 202 may determine that the gradient error has been minimized and output the composite image at block 520. In an instance in which the gradient error between the first image registration and the second image registration fails to satisfy the predetermined gradient change value, e.g. the gradient error has changed or has changed greater than the predetermined gradient change value, the processor 202 may repeat blocks 510-518, e.g. increment the transformation or deformation parameters and repeat the registration and comparison of gradient errors.

As shown in block 520 of FIG. 5, the apparatus 200 may include means, such as a processor 202, memory 204, communications interface 206, user interface 208, or the like, configured to output a composite image based on the registered first and second images. The processor 202 may output the composite image to a memory 204. In some example embodiments the processor may cause the communications interface to transmit the composite image to a memory 204, such as the image database 106 or other devices, such as UE 102. In some example embodiments, the processor 202 may cause the composite image to be displayed on a user interface 208.

Image registration in the gradient domain may allow for greater accuracy and robustness of the composite images. Gradient domain image registration may also reduce computation needed for intensity based image registration using a similarity measure.

As described above, FIG. 5 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 504 and 508-520 in FIG. 5. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a first image and second image; and
   registering the first and second images in a gradient domain, wherein registration of the first and second images in the gradient domain comprises:
      registering the first and second images based on first image registration parameters;
      determining a gradient error associated with a first image registration;
      generating a composite image, in an instance in which the gradient error satisfies a predetermined minimization value; and
      applying an energy minimization function based on total variation.

2. The method of claim 1, wherein registering the first and second images in the gradient domain further comprises:
   determining parameters for the first image registration; and
   determining if the gradient error satisfies the predetermined minimization value.

3. The method of claim 2, wherein registering the first and second images in the gradient domain further comprises:
   incrementing the image registration parameters for a second image registration;
   registering the first and second image based on the second image registration parameters;
   determining the gradient error associated with the second image registration;
   comparing the gradient error of the first image registration to the gradient error of the second image registration;
   determining if a change in gradient error between the first image registration and the second image registration satisfies a predetermined gradient change value; and
   generating a composite image, in an instance in which the change in gradient error satisfies the predetermined gradient change value.

4. The method of claim 3, wherein registering the first and second images in the gradient domain further comprises:
   reperforming the incrementing the registration parameters, registering the first and second image determining the gradient error, comparing the gradient errors.

5. The method of claim 1, wherein registration of the first and second images creates a gradient error, wherein the gradient error comprises total variation.

6. The method of claim 1, wherein registering the first and second images in the gradient domain is based on a gradient descent algorithm.

7. The method of claim 1, wherein a gradient in the gradient domain comprises an edge within an image.

8. An apparatus comprising at least one processor and at least one memory including computer program code, the at least one memory and computer program code configured to, with the processor, cause the apparatus to at least:
receive a first image and second image; and
register the first and second images in a gradient domain, wherein registration of the first and second images in the gradient domain comprises:
registering the first and second images based on first image registration parameters;
determining a gradient error associated with a first image registration;
generating a composite image, in an instance in which the gradient error satisfies a predetermined minimization value; and
applying an energy minimization function based on total variation.

9. The apparatus of claim 8, wherein registering the first and second images in the gradient domain further comprises:
determining parameters for the first image registration; and
determining if the gradient error satisfies the predetermined minimization value.

10. The apparatus of claim 9, wherein registering the first and second images in the gradient domain further comprises:
incrementing the image registration parameters for a second image registration;
registering the first and second image based on the second image registration parameters;
determining the gradient error associated with the second image registration;
comparing the gradient error of the first image registration to the gradient error of the second image registration;
determining if a change in gradient error between the first image registration and the second image registration satisfies a predetermined gradient change value; and
generating a composite image, in an instance in which the change in gradient error satisfies the predetermined gradient change value.

11. The apparatus of claim 10, wherein registering the first and second images in the gradient domain further comprises:
reperforming the incrementing the registration parameters, registering the first and second image determining the gradient error, comparing the gradient errors.

12. The apparatus of claim 8, wherein registration of the first and second images creates a gradient error, wherein the gradient error comprises total variation.

13. The apparatus of claim 8, wherein registering the first and second images in the gradient domain is based on a gradient descent algorithm.

14. The apparatus of claim 8, wherein a gradient in the gradient domain comprises an edge within an image.

15. A computer program product comprising at least one non-transitory computer-readable storage medium having computer-executable program code portions stored therein, the computer-executable program code portions comprising program code instructions configured to:
receive a first image and second image; and
register the first and second images in a gradient domain, wherein registration of the first and second images in the gradient domain comprises:
registering the first and second images based on first image registration parameters;
determining a gradient error associated with a first image registration;
generating a composite image, in an instance in which the gradient error satisfies a predetermined minimization value; and
applying an energy minimization function based on total variation.

16. The computer program product of claim 15, wherein registering the first and second images in the gradient domain further comprises:
determining parameters for the first image registration; and
determining if the gradient error satisfies the predetermined minimization value.

17. The computer program product of claim 16, wherein registering the first and second images in the gradient domain further comprises:
incrementing the image registration parameters for a second image registration;
registering the first and second image based on the second image registration parameters;
determining the gradient error associated with the second image registration;
comparing the gradient error of the first image registration to the gradient error of the second image registration;
determining if a change in gradient error between the first image registration and the second image registration satisfies a predetermined gradient change value; and
generating a composite image, in an instance in which the change in gradient error satisfies the predetermined gradient change value.

18. The computer program product of claim 17, wherein registering the first and second images in the gradient domain further comprises:
reperforming the incrementing the registration parameters, registering the first and second image determining the gradient error, comparing the gradient errors.

19. The computer program product of claim 15, wherein registration of the first and second images creates a gradient error, wherein the gradient error comprises total variation.

20. The computer program product of claim 15, wherein registering the first and second images in the gradient domain is based on a gradient descent algorithm.

* * * * *